(12) United States Patent
Hsieh et al.

(10) Patent No.: US 6,480,794 B1
(45) Date of Patent: Nov. 12, 2002

(54) METHOD FOR MINIMIZING TOTAL TEST TIME FOR TESTING FACTORIES

(75) Inventors: Ming-Hsiu Hsieh, Ban-Chiau (TW); Fu-Kang Lai, Hsin-Chu (TW); Wen-Feng Wu, Hsin-Chu (TW); Yi-Hsin Chan, Hsin-Chu (TW); Yao-Tung Liu, Tainan (TW); Yi-Chin Hsu, Hsin-Chu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 168 days.

(21) Appl. No.: 09/629,941

(22) Filed: Aug. 1, 2000

(51) Int. Cl.⁷ ................................................ G06E 19/00
(52) U.S. Cl. ........................................... 702/84; 700/99
(58) Field of Search ............................ 702/81; 700/99; 364/402

(56) References Cited

U.S. PATENT DOCUMENTS

| | | | |
|---|---|---|---|
| 5,546,326 A | 8/1996 | Tai et al. | 364/552 |
| 5,818,716 A | 10/1998 | Chin et al. | 364/468.06 |
| 5,825,650 A | 10/1998 | Wang | 364/468.06 |
| 5,826,238 A | 10/1998 | Chen et al. | 705/8 |
| 5,841,677 A | 11/1998 | Yang et al. | 364/569 |
| 5,880,960 A | 3/1999 | Lin et al. | 364/468.05 |
| 6,070,130 A | * 5/2000 | Gutmann et al. | 702/81 |
| 6,198,980 B1 | * 3/2001 | Costanza | 700/99 |

OTHER PUBLICATIONS

An article, by Wayne L. Winston, "Operations Research", Applications and Algorithms, Second Edition, PWS–Kent Publishing Co., Boston, 1990, pp. 345–353.

* cited by examiner

Primary Examiner—John S. Hilten
Assistant Examiner—Xiuqin Sun
(74) Attorney, Agent, or Firm—George O. Saile; Stephen B. Ackerman; Graham S. Jones, II (57) ABSTRACT

To allocate products for machines on a manufacturing line, provide a standard test time. Minimize total test time with respect to production scheduling. Form a supply demand matrix table for products and machines for product allocation. Find the grid location with minimum testing time. Provide maximum time allocation from a machine at the corresponding position on the matrix table. Determine the grid location with the next minimum testing time. Loop back to provide a maximum allocation of remaining time from the corresponding machine and repeat looping back until no demand is left. Find need for an optimum testing process by testing whether only one machine can test the product and no quantity is allocated to a machine. If YES branch to calculate utilization per machine. If NO, decide whether $N_{COL}+N_{LIN}-1=NV_B$. If YES perform optimum testing. If NO, branch to calculate machine utilization per machine.

20 Claims, 9 Drawing Sheets

| machine / Product | J953-1 j=1 | J953-2 j=2 | S15 j=3 | TRILL j=4 | ITS j=5 | VV j=6 | J971 j=7 | DELTA j=8 | Dummy machine j=9 | Quanity |
|---|---|---|---|---|---|---|---|---|---|---|
| TM1000 i=1 | 30 | 30 | | | | | | | 99999 | 96 |
| TM1179 i=2 | 10 | 10 | | | | | | | 99999 | 12 |
| TM1946 i=3 | M | M | 7.8 | 18.5 | M | M | | | 99999 | 164 |
| TM2338 i=4 | M | M | 11.5 | M | M | M | | | 99999 | 1230 |
| TM2660 i=5 | M | M | M | 58.5 | 14.9 | 20.5 | | | 99999 | 168 |
| TM3506 i=6 | M | M | 18.8 | 8.7 | M | M | | | 99999 | 960 |
| TM3546 i=7 | M | M | M | 8.8 | M | M | 9.7 | M | 99999 | 11760 |
| TM3721 i=8 | M | M | M | 18.5 | M | 13 | M | M | 99999 | 61 |
| TM3966 i=9 | M | M | M | 23.7 | M | M | 23.9 | M | 99999 | 195 |
| TM4152 i=A | M | M | M | 12 | M | M | M | 13.5 | 99999 | 3600 |
| TM4916 i=B | M | M | M | 30.1 | M | M | M | 31.3 | 99999 | 912 |
| TM5557 i=C | M | M | M | 10.5 | M | M | M | 14 | 99999 | 1545 |
| Available capacity | 26508 | 30420 | 63694 | 39782 | 33780 | 61353 | 65340 | 67620 | ∞ | |

FIG. 2

| machine / Product | J953-1 j=1 | J953-2 j=2 | S15 j=3 | TRILL j=4 | ITS j=5 | VV j=6 | J971 j=7 | DELTA j=8 | Dummy machine j=9 | Quantity |
|---|---|---|---|---|---|---|---|---|---|---|
| TM1000 i=1 | 30 / 96 | 30 / 0 | M | M | M | M | M | M | 99999 | 96 |
| TM1179 i=2 | 10 / 12 | 10 / 0 | M | M | M | M | M | M | 99999 | 12 |
| TM1946 i=3 |  | M | 7.8 / 164 | 18.5 / 0 | M | M | M | M | 99999 | 164 |
| TM2338 i=4 |  | M | 11.5 / 1230 | M | M | M | M | M | 99999 | 1230 |
| TM2660 i=5 | M | M | 18.8 / 0 | 58.5 / 0 | 14.9 / 0 | 20.5 / 168 | M | M | 99999 | 168 |
| TM3506 i=6 | M | M | M | 8.7 / 960 | M | M | M | M | 99999 | 960 |
| TM3546 i=7 | M | M | M | 8.8 / 3571 | M | M | 9.7 / 6736 | M | 99999 / 1453 | 11760 |
| TM3721 i=8 | M | M | M | 18.5 / 0 | M | 13 / 61 | M | M | 99999 | 61 |
| TM3966 i=9 | M | M | M | 23.7 / 0 | M | M | 23.9 / 0 | M | 99999 / 195 | 195 |
| TM4152 i=A | M | M | M | 12 / 0 | M | M | M | 13.5 / 3600 | 99999 | 3600 |
| TM4916 i=B | M | M | M | 30.1 / 0 | M | M | M | 31.3 / 0 | 99999 / 912 | 912 |
| TM5557 i=C | M | M | M | 10.5 / 0 | M | M | M | 14 / 1358 | 99999 / 187 | 1545 |
| Available capacity | 26508 | 30420 | 48269.8 | 0 | 33780 | 57116 | 0 | 0 | ∞ |  |

FIG. 3

|  | J=1 | J=2 | J=3 | J=4 |  |
|---|---|---|---|---|---|
| I=1 | (35) (8) | 6 | 10 | 9 | 35 |
| I=2 | 10  9 | 20  12 | 20  13 | 7 | 50 |
| I=3 | 14 | 9 | 10  16 | 30  5 | 40 |
|  | 45 | 20 | 30 | 30 |  |

"Quantity Allocated" → 35; "Test Time" → 8

FIG. 4

|  | J=1 | J=2 | J=3 | J=4 |  |
|---|---|---|---|---|---|
| I=1 | 35  8 | 6 | 10 | 9 | 35 |
| I=2 | 10  9 | 20  12 | 20  13 | 7 | 50 |
| I=3 | 14 | entering b-v  9 | 10  16 | 30  5 | 40 |

| | J=1 | J=2 | J=3 | J=4 | |
|---|---|---|---|---|---|
| I=1 | 35​ 8 | 6 | 10 | 9 | 35 |
| I=2 | 10​ 9 | ⊖20​ 12 | ⊕20​ 13 | 7 | 50 |
| I=3 | 14 | ⊕​ //9// | ⊖10​ 16 | 30​ 5 | 40 |

FIG. 7

| | J=1 | J=2 | J=3 | J=4 | |
|---|---|---|---|---|---|
| I=1 | 35​ 8 | 6 | 10 | 9 | 35 |
| I=2 | 10​ 9 | 10​ 12 | 30​ 13 | 7 | 50 |
| I=3 | 14 | 10​ 12 | //0//​ 16 | 30​ 5 | 40 |

FIG. 8

| | | J=1 | J=2 | J=3 |
|---|---|---|---|---|
| I=1 | machine / product | TRILL | 515 | dummy |
| I=2 | TM1234 | 35​ 30 | 70​ 20 | 100​ 99999 |
| I=3 | TM5678 | 60​ 10 | M | 200 |

FIG. 9

METHOD FOR MINIMIZING TOTAL TEST TIME FOR TESTING FACTORIES

BACKGROUND OF THE INVENTION

1. Field of the Invention

This invention relates to methods of allocating products to be tested to machines on a manufacturing line and more particularly to allocating products to the machines in view of capacity to handle products to be manufactured before testing. The invention teaches a method to minimize tool test time for testing factories.

2. Description of Related Art

In testing a factory, the unstable output data from the front-end of a manufacturing line results in frequent tester setup changes and severely late deliveries. But testing is often requested to catch-up to compensate for the delays which occurred on the front-end of the manufacturing line.

U.S. Pat. No. 5,880,960 of Lin et al. shows a method to balance WIP in a factory.

U.S. Pat. Nos. 5,841,677 of Yang et al., 5,826,238 of Chen et al., 5,818,716 of Chin et al., 5,825,650 of Wang and 5,548,326 of Tai et al. show methods for optimizing factory cycle time.

Disadvantages of current practices:

1) In the past, there has been no optimal methodology for allocating capacity before testing arranged a production schedule.
2) It has been difficult to prepare and to forecast the capability and capacity of the testers.
3) There has been neither an appropriate algorithm nor an appropriate procedure for measuring/setting accurate test times.
4) There has been no integrated system for utilizing all testers for testing of multiple FAB sites, referred to herein as the N-site, S-Site and T-site.

SUMMARY OF THE INVENTION

Objects of the system of this invention are as follows:
(1) A powerful/friendly web-based tool: Visible to calculate forecasted loading of both sites for testing at any time and feedback to Sales/CPD (Central Planning Department)/FAB(Fabrication Plant).
(2) An easy way to query test times quickly for any product.
(3) Integrate basic data & procedure between N-PC, N-Testing, S-PC, IE&OE, S-Testing, and TOM

| | |
|---|---|
| FAB = | Fabrication Plant |
| N-PC = | N-site Production Control Department |
| N-Testing = | N-site Testing Department |
| S-PC = | S-Site Production Control Department |
| IE&OE = | Industrial Engineering and Operation Efficiency Department |
| S-Testing = | S-site Testing Department |
| TOM = | Total Order Management Department |
| Tij = | Testing time for grid position ij is the time for machine j to test product i |
| Xij = | Demand quantity dispatched for grid position ij |
| Ui = | variable which is used to decide "entering basic variable" |
| Vj = | same as Ui |
| CP product = | Circuit Probing product |
| PB product = | same as CP product |
| FT product = | Final Test product |
| $N_{COL}$ = | number of columns of the transporting matrix. |
| $N_{LIN}$ = | number of lines of the transporting matrix. |
| $V_{NB}$ = | Non-Basic Variable |
| $NV_B$ = | the Number of a Basic Variable which has been dispatched, some demand quantity |
| Non-basic variable = | A variable that is not basic is called a non basic variable |

This invention comprises a testing method for an automatic capacity information integrated system, and more particularly, to a method for setting a standard test time and minimizing the total test time with respect to production scheduling in factories.

In accordance with this invention, a method and a system are provided for allocating products to be tested to machines on a manufacturing line by providing a standard test time, minimizing the total test time with respect to production scheduling in factories, and forming a supply demand matrix table for the products and the machines to which the products are to be allocated.

Preferably the method and system include steps and means for performing those steps, as follows:

provide the table with the testing time for the machine and the product corresponding to the location on the matrix table;

determine the grid location with the minimum testing time Tij;

provide the largest possible allocation of time from the corresponding machine at the corresponding position on the matrix table;

the system loops back to provide the largest possible allocation of remaining time from the corresponding machine, the system continues to loop until no demand is left;

determine whether an optimum testing process is required, preferably by testing whether only one machine can test the product and no quantity is allocated to a machine and if YES branching to calculating of the utilization of each machine and if NO, then decide whether as follows $$N_{COL}+N_{LIN}-1=NV_B \qquad (2)$$

where:

$N_{COL}$=number of columns of the transporting matrix,
$N_{LIN}$=number of lines of the transporting matrix,
$NV_B$=number of basic variable, if YES then proceeding to perform optimum testing, and if NO the branching to calculate the utilization of each machine.

Preferably the method and system include as follows:

deciding whether the demand quantity is allocated to a dummy machine, if NO, then END the program and if YES, then proceed to decide whether $$N_{COL}+N_{LIN}1=NV_B, \text{ and}$$

if NO, then END the program if YES, then proceed, eliminate the product row that can be tested at one machine, eliminate the machine column that can test only one product, eliminate the column or row which is irrelevant to a dummy machine with an allocated demand quantity.

Preferably the method and system include further as follows:

choosing the column or row that has the larger number of basic variables and assigning its U or V value to be zero (0), and get all values of Ui and Vj by using every relation of the basic formula Tij=Ui+Vj, calculate Tij−Ui+Vj of non-variable and largest absolute value in all negative numbers, and if there is a tie randomly choosing one.

decide whether (Tij−Ui−Vj) of all non-variables is larger than 0;

If YES, then the current solution is optimum and the procedure is stopped and if NO, then the system proceeds to calculating the utilization of each machine, and calculate the utilization of each machine as follows:

average divide the product quantity on the "dummy" machine to every feasible machine wherein the dummy machine is designed to deal with a quantity which cannot be allocated to other machines that have been overloaded so in this step the system is employed to average dividing the overloaded quantity to every feasible machine for the purpose of calculating the final utilization of every machine, calculate Machine Utilization (MU) by the formula as follow:

$$MU = \frac{\left[\frac{\Sigma(\text{Quan alloc} * \text{Treq})}{\text{efficiency \%}} + \text{engineering time}\right]}{(\text{working day} * \text{machine quantity} * \text{available\%})} \quad (3)$$

DEFINITIONS

| | |
|---|---|
| efficiency = | $\frac{\text{average actual test time}}{\text{theoretical test time}}$ |
| engineering time = | Time required to run a pilot run |
| Quan_alloc = | Quantity allocated |
| Treq = | required test time |
| Available capacity = | WD * MQ * AW |
| WD = | Working Day |
| MQ = | Machine Quantity |
| AW = | Available Working |
| day = | duration of working day in minutes |
| machine quantity = | number of machines |
| available % = | (1−down % − PM % − OFF % − monitor %) | decide whether the same machine can process both the CP product and the FT product and if the result of the decision is NO, then the system proceeds to block to END the program; and if the result of the decision in block is YES, then the system proceeds to process machine utilization for a CP product, calculate the number of machines needed for CP adjusted for GP, calculate the number of machines needed for FT adjusted for FT, calculate the number of machines needed for a CP product, calculate the number of machines needed for a FT product, decide whether there is an insufficient number of machines or an excess number of machines by answering the question "Is utilization greater than or equal to 100%?", if the answer is YES, then the system determines that the machine shortage number equals as follows:
(utilization−1)*machine number, if the answer is NO, then the system determines that the machine excess number equals as follows:
(1−utilization)*machine number, and then the routine ends.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

Optimal Capacity Allocation Algorithm

Part I

Generate Basic Feasible Solution

FIGS. 1A–1D show a composite flow chart of steps required to perform the method of this invention.

Step I

Build Up Supply-Demand Table

Figure 1A:
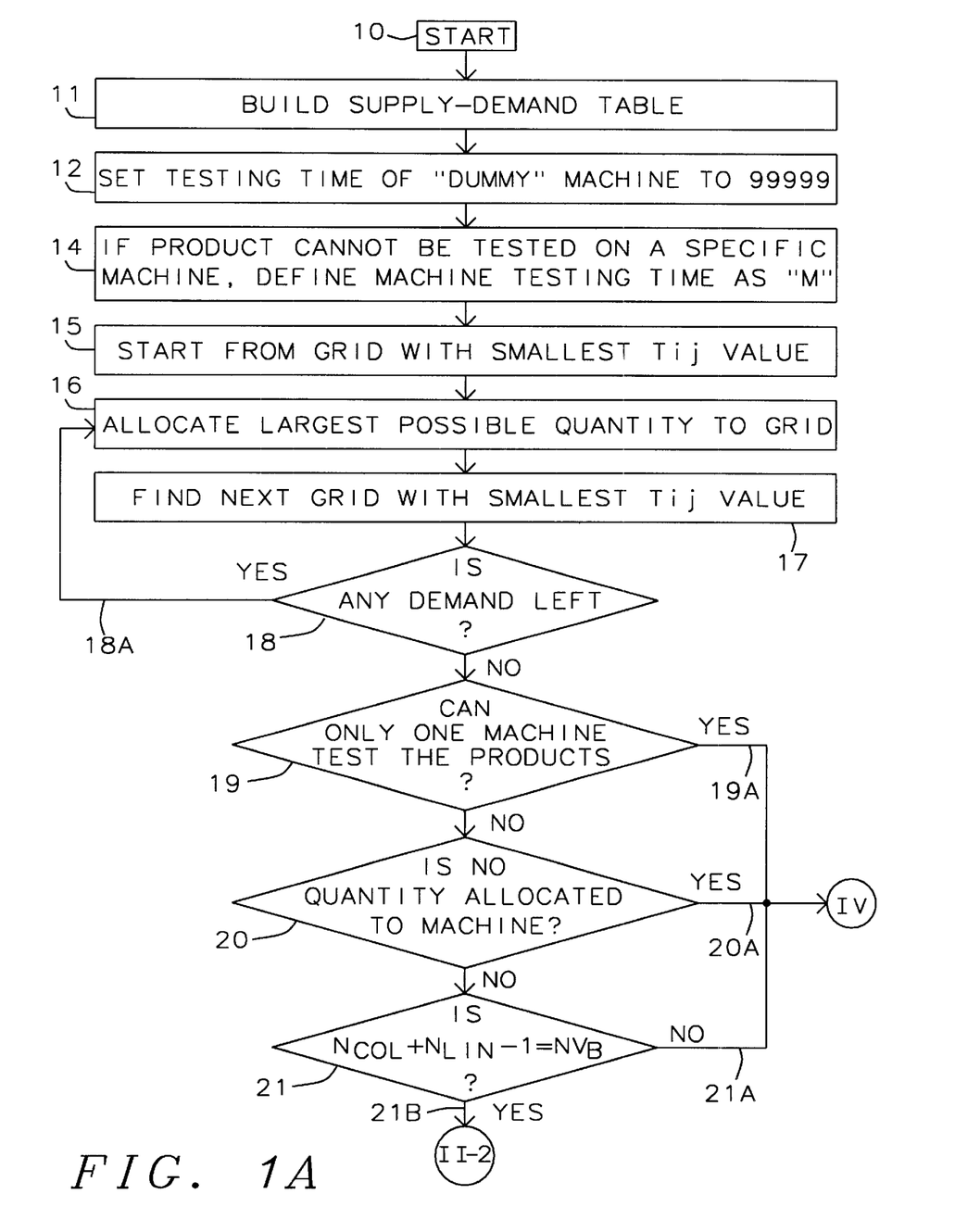
FIGS. 1A–1D show a composite flow chart of steps required to perform the method of this invention.
Figure 2:
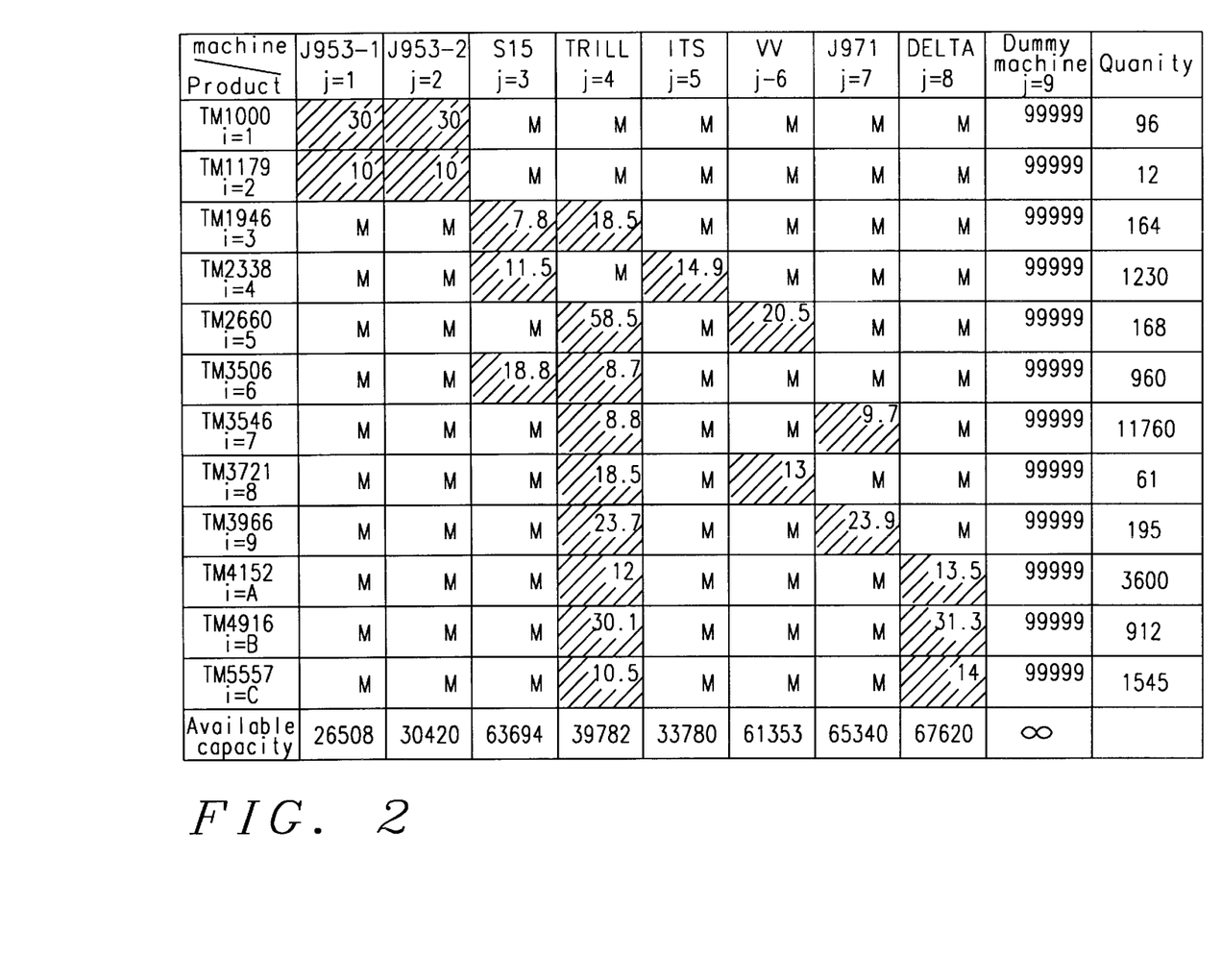
FIG. 2 shows an example of a completed supply-demand table of grid positions in a matrix formed in accordance with this invention showing the testing times Tij for grid positions ij indicated in the upper right hand corners thereof.
Figure 3:
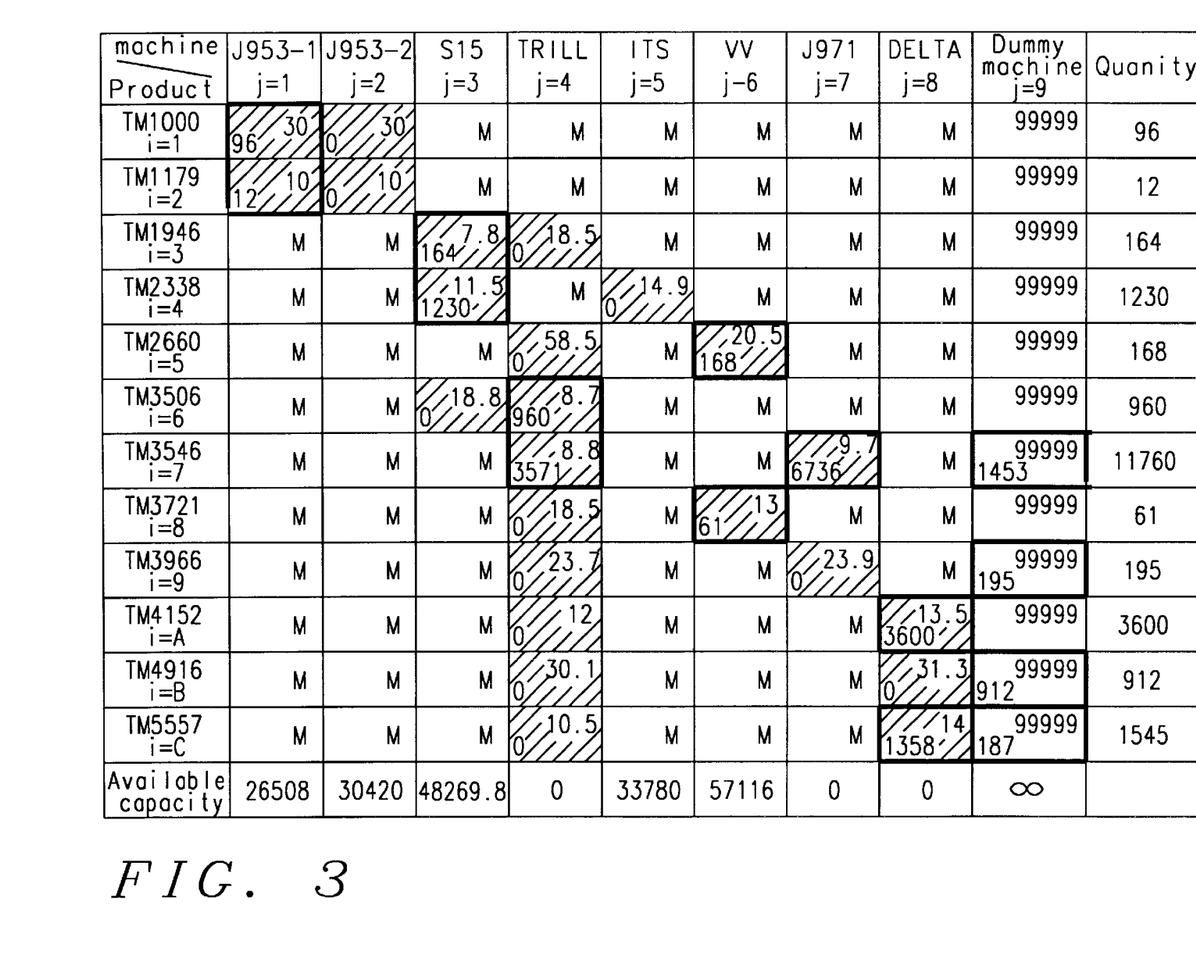
FIG. 3 shows the table of FIG. 2 with the addition of quantities Xij dispatched for some individual grid positions ij.

This is the first block 10 in FIG. 1A which is to build up the supply-demand table which is shown in FIGS. 2 and 3 listing by products line-by-line "i" versus the machines column-by-column "j".

FIG. 2 shows an example of a completed supply-demand table of grid positions in a matrix formed in accordance with this invention showing the testing times Tij for grid positions ij indicated in the upper right hand corners thereof.

FIG. 3 shows the table of FIG. 2 with the addition of demand quantities Xij dispatched for some individual grid positions ij.

Referring to FIG. 2 an example of a completed supply-demand table is shown which is a matrix of grid positions ij of machines in rows "i" (where "i"=1, 2 . . . 8, 9) and products in columns "j", (where "j"=1, 2 . . . 9, A, B, C) with the available capacity of each of the test machines listed in the last row, at the bottom of the matrix and the quantity of products to be tested for each product listed in the far right hand column. In the upper right hand corner Tij is the testing time required for machine "j" to test a product "i". In FIG. 2, T11=30, T12=30, T13 . . . T18=M; in the second row of FIG. 2, T21=10, T22=10, T23 . . . T28=M; in the third row of FIG. 2, T31=M, T32=M, T33=7.8; T34=18.5 and T34 . . . T38=M.

FIG. 3 shows the table of FIG. 2 with the addition of demand quantities Xij dispatched for some individual grid positions ij. The build-up supply-demand table of FIG. 3 includes the Tij testing times plus the demand quantities Xij which are the quantities which have been dispatched for same of the grid positions ij, which is listed in the lower left corner on every grid position.

1-1) In block 12 of FIG. 1A, the program sets the testing time to the arbitrary number of 9999 minutes. Referring FIGS. 2 and 3, in the next to last column the quantity of 9999 is shown for a pre-assumed "dummy" machine for which a testing time of 99999 minutes is assigned to deal with the quantity that cannot be allocated to other overloaded machines. Since testing time of the "dummy" machine is much longer than that of all of the normal machines, usually a product is not be allocated to the "dummy" machine unless all normal machines have been overloaded.

1-2) In block 14 in FIG. 1A, the product to be tested cannot be tested on a specific machine, e.g. j=1, 2, . . . 8, the testing time, Tij, of that machine will be defined as a maximum value 'M'.

The available capacity of the initial transporting matrix of grid positions Tij is the denominator of the "utilization formula" in equation (3) below. The denominator of the "utilization formula" (3) is as follows:

(working day)*(machine quantity)*(available %)
For example:

| | |
|---|---|
| working day = | 24 hours/day * 60 min/hour = 1,440 min./day |
| machine quantity = | number of machines, e.g. |
| available % = | (1 − down % − PM % − OFF % − Monitor %) that is the percentage of time to perform its normal production; |
| PM = | Preventive Maintenance |

Step II

In block 15 of FIG. 1A, the program starts at the grid position ij in the matrix of product rows "i" and tool columns "j" to be tested with smallest Tij value as shown in FIGS. 2 and 3.

In the example shown in FIG. 2, the smallest value of Tij (T33, row 3; column 3) is 7.8 which is found at the joint position for product TM1946 (i=3) and machine S15 (j=3).

Step III

In block 16 of FIG. 1A, to satisfy the demand of the product with the smallest value of Tij which has just been selected, the program allocates to the grid position ij with the smallest Tij value number the largest possible quantity of the product "i" to the machine "j" at grid position ij required to satisfy the demand of the product with the smallest value of Tij.

The unit used to measure supply "Available Capacity" (AC) is time in minutes and the unit used to measure demand is pieces. Thus, in block 16 the system calculates and converts the unit of demand quantity Xij into minutes so that the demand and supply quantities are in the same units by calculating required test time Treq as follows:

$$Treq = Xij * Tij \qquad (1)$$

where: Treq=Total required testing time for a product for given grid position ij in the matrix.

Referring to FIG. 2, since the demand quantity Xij of product TM1946 X33=164 wafers and its testing time Tij, T33=7.8 minutes/wafer, then Total required testing time Ttot for all units of the product is calculated as follows:

$$Ttot = Prod\_Quant * Treq$$

$$Ttot = 164 \text{ wafers} * 7.8 \text{ min./wafer} = 1{,}279.2 \text{ minutes.}$$

Meanwhile, the available capacity of machine S15 is 63,694 minutes that is larger than demand. Therefore in block 16, the system assigns all 164 wafers of product TM1946 to machine S15 and the Remaining Available Capacity (RAC) will be as 62,414.8 min. which is calculated as follows $$RAC = AC - Ttot = 63{,}694.0 \text{ min.} - 1{,}279.2 \text{ min.} = 62{,}414.8 \text{ min.}$$

Step IV

At this point the system finds the grid position ij in the matrix of grid positions ij with the next smallest value of Tij and then continuously loop back to Step III to allocate the demand quantity, until there is no demand left.

In block 17, the system finds the next grid position ij with smallest Tij value.

Then in decision block 18, the system determines whether there is any unsatisfied demand left.

If the decision in block 18 is NO, then the system loops back on line 18A to repeat Step III to allocate the RAC (remaining available capacity) to satisfy quantity demanded until there is no demand left.

If an the other hand the decision in block 18 is YES, then the system proceeds to block 19 (below).

In the example shown in FIG. 2, the next smallest value of Tij (T64; row i=6; column i=4 is 8.7 at the joint grid position i=6, j=4 or T64 for a product (referred to here as the TM3506 product) and a machine (referred to here as the TRILL machine.)

Since the demand quantity for the TM3506 product is 960 wafers and its required testing time Treq is 8.7 min./wafer, the Treq is 8,352 min. which is calculated as follows:

$$Ttot = Prod\_Quant * Treq = 960 \text{ wafers} * 8.7 \text{ min/wafer} = 8{,}352 \text{ min.}$$

As the TRILL machine in column j=4 has an Available Capacity (AC) of 39,782 min. which exceeds the demand quantity of 8,352 min., all 960 wafers of the TM3506 product can be allocated to the TRILL machine. The Remaining Available Capacity (RAC) of the TRILL machine in terms of minutes is as follows:

$$RAC = AC - Ttct = 39{,}782 - 8{,}352 = 31{,}430 \text{ min.}$$

In the third loop of Steps III and IV, the next smallest value of Tij (T74; row 7; column 4) is 8.8 which is the joint grid positions Tij for product TM3546 and the TRILL machine. As demand quantity for product TM3546 is 11,760 wafers and the required testing time is 8.8 min./wafer, the total testing time is 103,488 min., which is calculated as follows:

$$Ttot=\text{Prod\_Quant}*Treq$$

$$Ttot=11{,}760 \text{ wafers}*8.8 \text{ min./wafer}=103{,}488 \text{ min.}$$

But the Remaining Available Capacity (RAC) for the TRILL machine is 31,430 min. that is smaller than demand. Therefore, the TRILL machine can only provide its RAC (Remaining Available Capacity) of 31,430 min. that is 31,430/8.8=3,571 wafers. And at this moment, the remaining capacity of the TRILL machine is 0 and there are 8189 wafers of product TM3546 can not be allocated.

Part II

In these steps, the system decides whether there is a need to perform Part III of the process of this invention, i.e. optimum testing.

In blocks 19, 20 and 21 the system decides whether it is necessary to perform the process of Part III (below) which comprises "Optimum testing" or whether the system should branch to Part IV (below).

1) If any of the following conditions is satisfied, then the system branches directly to Part IV (below).

1-1) In block 19, the system asks whether the product in the transporting matrix of grid positions Tij; can only be tested at one single machine. If the answer is YES, there will be no ability to make an adjustment of allocation to any other machine. Therefore, the system branches on line 19A (via circle-IV to FIG. 1D) directly to Part IV, i.e. to calculate the utilization of every machine, since the process of Part III would be of no value under these circumstances. If the answer determined in block 19 is NO, then the system proceed to block 20.

Figure 1B:
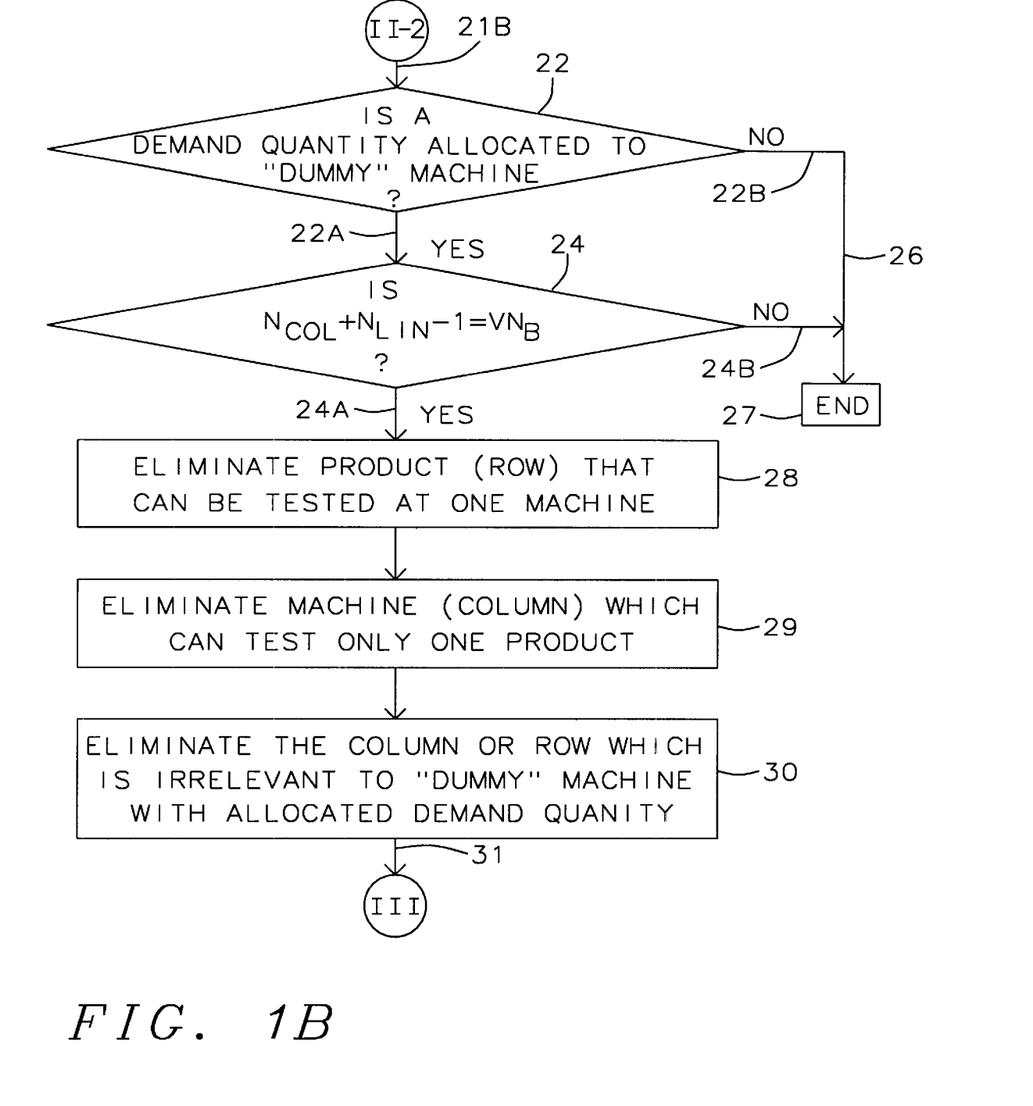

1-2) In block 20, the system asks whether there are no quantities of product demands being satisfied by allocation of service to the "dummy" machine. If the answer is YES, then the program branches on line 20A (via circle-IV to FIG. 1D) directly to the processing steps in Part IV (below), which is to calculate the utilization of every machine as seen in FIG. 1D. This situation indicates that all quantities demanded can be allocated to normal machines and the machine utilization will not exceed 100% anywhere in the FAB. Since this is not for on-site dispatching, the system does not need to process the optimum testing algorithm to shorten execution time. If the answer determined in block 20 is NO, then the system proceeds to block 21.

1-3) In block 21, the system asks the question defined by the equations as follows $$N_{COL}+N_{LIN}-1=NV_B \qquad (2)$$

where:

$N_{COL}$=Number of COLumns of the transporting matrix.
$N_{LIN}$=Number of LINes of the transporting matrix.
$NV_B$=Number of the Basic Variable.

If the answer is NO, that $(N_{COL}+N_{LIN})-1$ does not equal $NV_B$, that indicates the optimum solution has been obtained so the system branches on line 21A (via circle-IV to FIG. 1D) directly to Part IV of the process, i.e. to calculate the utilization of every machine. Otherwise, if the answer is NO, then the system proceeds on line 21B (via circle-II-2 to FIG. 1A, to step 22 on FIG. 1B.

2-1) In step 22 (FIG. 1B) the system decides whether there is a demand quantity which is being allocated at the "dummy" machine, that indicates that the utilization of at least one machine has exceeded 100%, If YES, the system proceeds on line 22A and line 26 to END block 27.

If NO, the system goes on line 22B and line 26 to END block 27 to end the routine.

2-2) Next in decision block 24, for the new related transporting matrix, a decision is made for the new transporting matrix as to whether the number of columns plus the number of lines minus one equals the basic variable $NV_B$ which is stated in algebraic form as follows:

$$\text{Does } N_{COL}+N_{LIN}-1=V_B? \qquad (3)$$

If the answer is YES that $N_{COL}+N_{LIN}-1$ equals the basic variable $V_B$, then the system proceeds on line 24A to block 28.

If the answer is NO that $N_{COL}+N_{LIN}-1$ does not equal the basic variable $V_B$, then the system proceeds on line 24B and line 26 to END block 27 to end the routine.

This is done to obtain the optimum capacity distribution by scattering demand quantity from the machines being overloaded. The new related transporting matrix of grid positions Tij is generated to reduce the dimensions of the matrix of grid positions Tij and to shorten the program execution time.

The rule for generation of the new related transporting matrix is as follows:

1) Then in block 28 the system eliminates from the matrix of FIGS. 2 and 3 a product (row "i") which can be tested by only one machine; i.e. no other testing machine ran perform the task so allocation of that product to another machine is not possible so any further consideration would be pointless. Block 28 leads to block 29.

2) In block 29 the system eliminates any machine (column) which can test only one product from the matrix. Block 29 leads to block 30.

3) In block 29 the system eliminates a column or row which is irrelevant to the "dummy" machine with the allocated demand quantity.

Figure 1C:
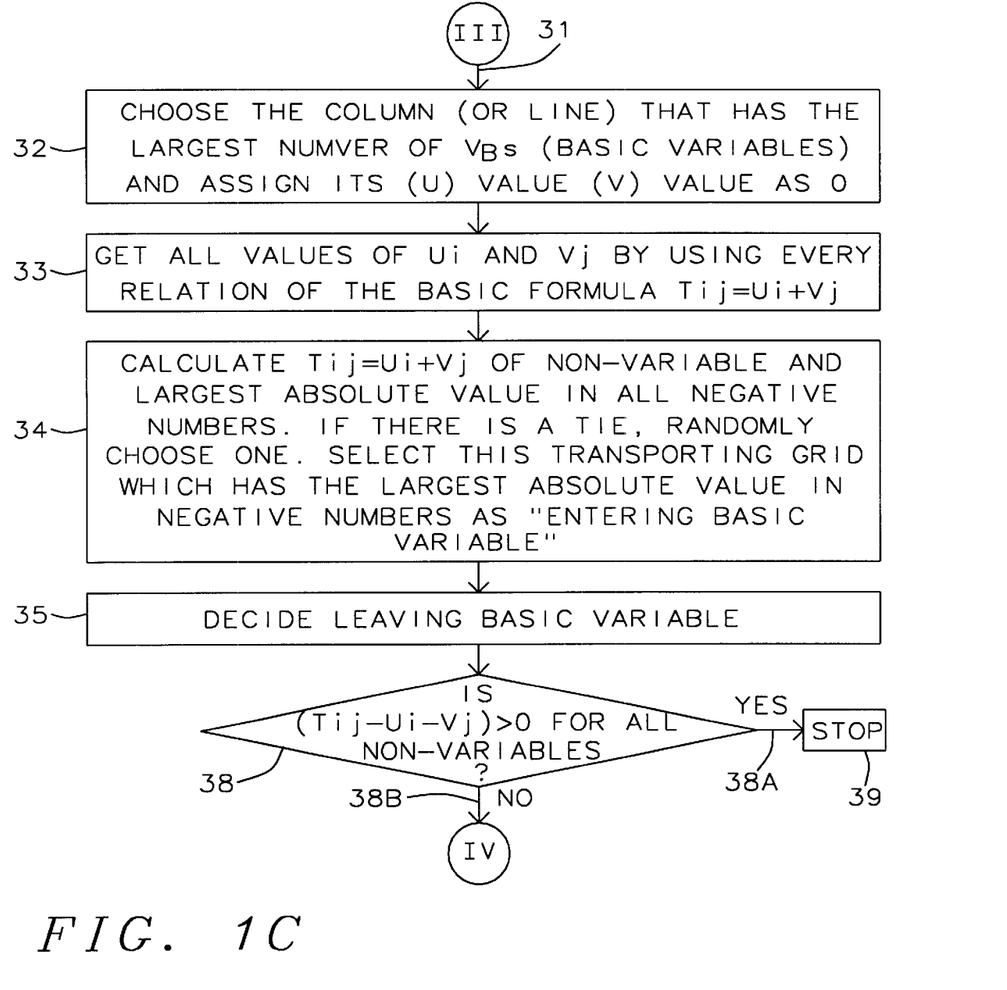
Figure 1D:
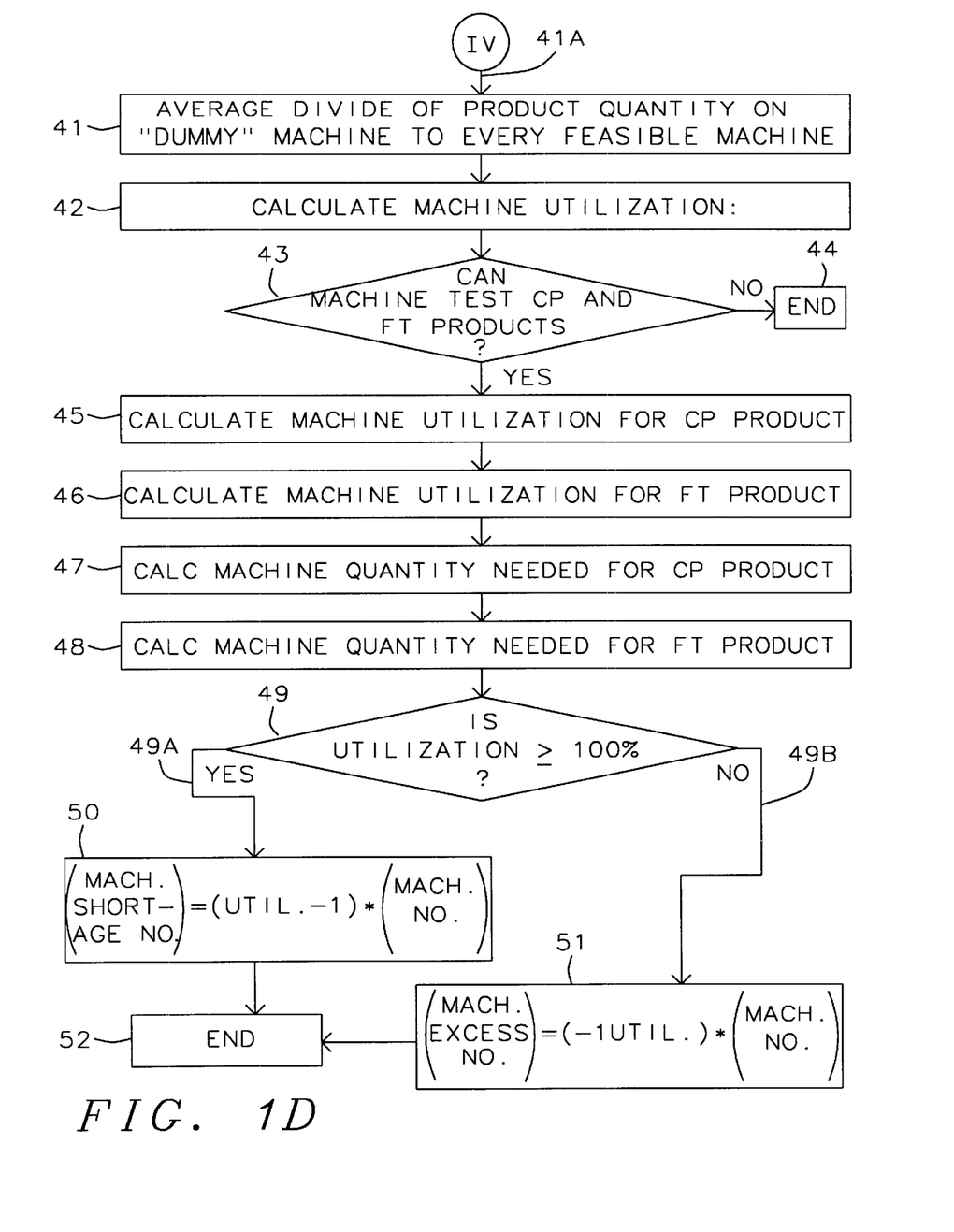

(circle-III) to block 32 in FIG. 1C.

Then the process proceeds from block 30 via line 31 (via circle III) to FIG. 1C to perform Part III of the process comprising "optimum testing".

Part III

OptimumTesting—Search for Optimum Solution

Step 1

Decide "Entering Basic Variable"

FIG. 3 shows a grid (matrix) of columns for J=1, 2, 3 and 4 and rows I=1, 2, and 3 with the quantity allocated of 35 and test time of 8 for $\text{Grid}_{11}$ J=1 and I=1.

1-1) In block 32, the system chooses the column or line that has the largest number basic variable and assign its U value/V value as 0.

Then the system proceeds to block 33.

In block 33, the system then gets all values of Ui and Vj by using every relation of basic variable Tij=Ui+Vj. The system then moves on to block 34.

1-2) In block 34, the system then calculates (Tij−Ui−Vj) of the non-variable and chooses the largest absolute value in all negative numbers. The system randomly chooses one alternative if there is a tie. This transporting grid position Tij is "entering basic variable." FIG. 4 shows a table for entering a basic variable =>$\text{Grid}_{32}$.

Figure 4:
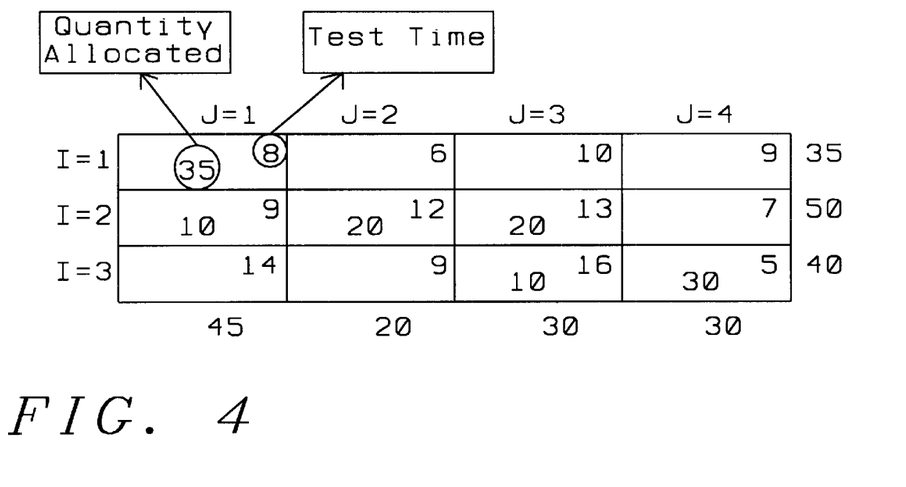
FIG. 4 shows a table illustrating test times for grid of columns I and rows J with a test time for all twelve grid positions and quantities allocated to six of the positions.

In FIG. 4, $Grid_{11}$, $Grid_{21}$, $Grid_{22}$, $Grid_{23}$, $Grid_{33}$, $Grid_{34}$, and $Grid_{32}$ is entering the basic variables.

Then the system proceeds to block 35.

Step II

Figure 5:
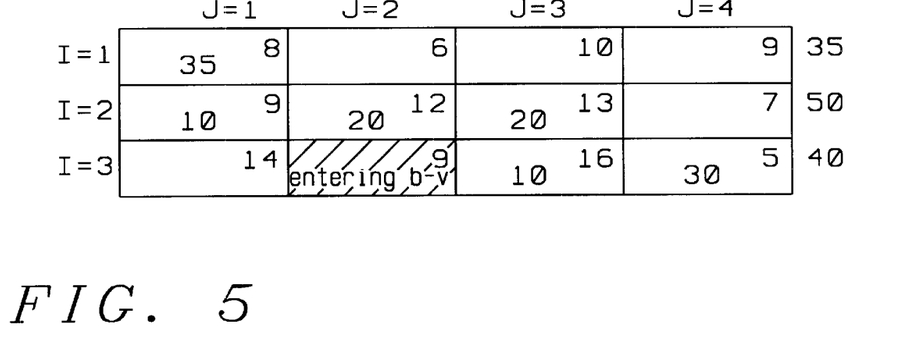
FIG. 5 shows a table illustrating entering a basic variable.
Figure 6:
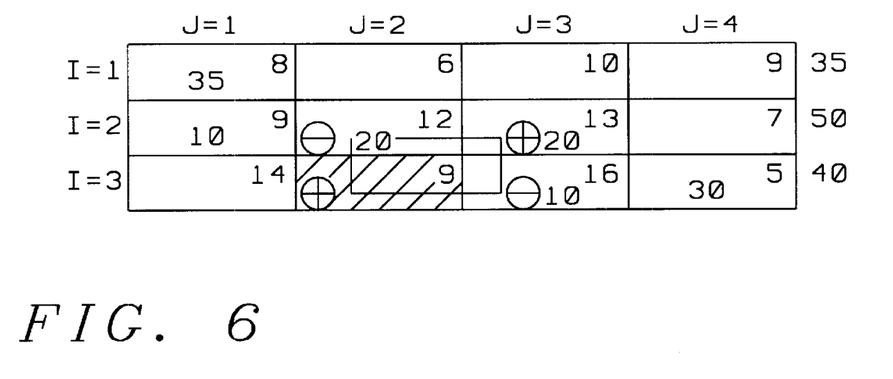
In FIG. 6 the system decides upon leaving basic variable and reviews all donors to find which has the smallest quantity allocated.

In Block 35, the System DECIDE Leaving-Basic Variable 2-1) Start at Grid position $Grid_{32}$ "entering basic variable" in FIG. 5 and in FIG. 6 find the loop involving entering the variable and some of the basic variables as in the table of FIG. 5. We mark "+" and "−" alternately through the pre-specific loop.

For example, we marl: "+" on entering the basic variable ($Grid_{32}$) and "−" on the next grid ($Grid_{22}$), "+" on the grid ($Grid_{23}$), "−" on the last grid ($Grid_{33}$) clockwise on the table of FIG. 5.

2-2) The symbol "+" means receiver and the symbol "−" means donor. From the loop of FIG. 6, we review all donors to find which has the smallest quantity allocated. Clearly $Grid_{33}$ has the smallest quantity allocated which is "10". We refer to $Grid_{33}$ as "leaving basic variable", because $Grid_{33}$ will donate all original quantity allocated and the quantity allocated will be zero.

Step III

Decide "New Feasible Solution"

In block 36, the system decides on a "new feasible solution". Add the value of "leaving basic variable" to the allocation quantity of every grid of the receiver and subtract from the allocation quantity of every donor.

Example

Figure 7:
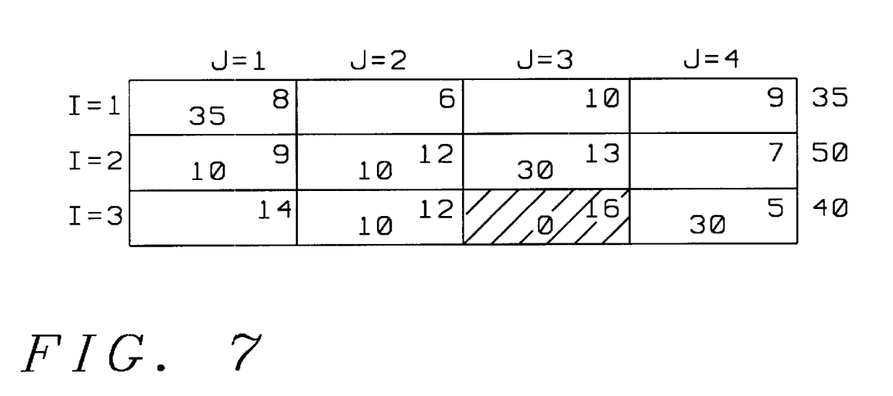
In FIG. 7 the system decides upon the new feasible solution.

All donors will donate a quantity of 10 to all receivers, i.e. referring to FIGS. 6 and 7. Thus, the quantity of $Grid_{22}$ is reduced from 20 to 10, and the quantity of $Grid_{33}$ of is reduced from 10 to 0.

On the other hand the quantity of all of the receivers will increase by 10 so the quantity of $Grid_{33}$ of will be increased from 0 to 10, and the quantity of $Grid_{23}$ of will be increased from 20 to 30.

Figure 8:
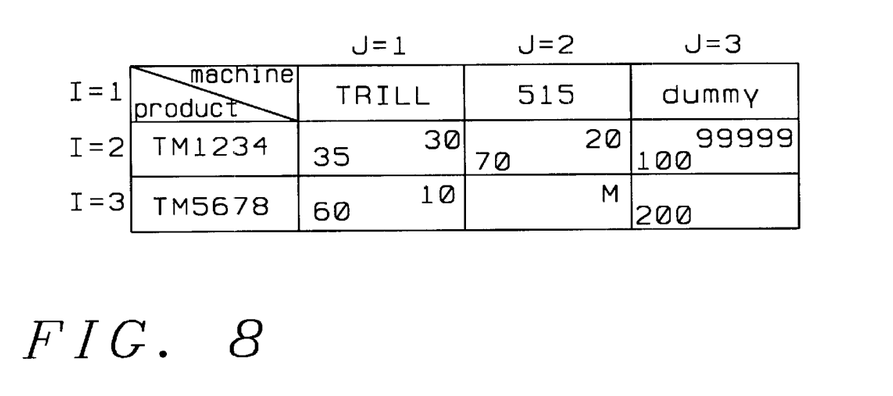
FIG. 8 shows the new quantity allocation, which is the "new feasible solution" for $\text{Grids}_{11}$ (35), $\text{Grid}_{21}$ (10), $\text{Grid}_{22}$ (10), $\text{Grid}_{32}$(10), and $\text{Grid}_{23}$(30).

FIG. 8 shows the new quantity allocation, which is the "new feasible solution" for $Grids_{11}$ (35), $Grid_{21}$ (10), $Grid_{22}$ (10), $GridV_{32}$(10), and $Grid_{23}$(30). As stated above, $Grid_{33}$ has donated all original quantity allocated and the quantity allocated is now shown as zero.

Then the system proceeds to the decision block 38.

Stop Iteration Rule

In decision block 38, the decision is based upon the question "Is (Cij-Ui-Vj) of all non-variables larger than 0?"

If YES, then the current solution is optimum and the procedure should be stopped so the system proceeds on line 38A to STOP block 39.

If NO, then the system proceeds on line 38B (via circle-IV) to line 41A to block 41 in FIG. 1D.

Part IV

Calculate the Utilization of Every Machine

Step I

In order to calculate utilization for every machine (Final), it is necessary for every available machine to share "dummy" machine loading with every feasible machine.

In step 41, the system performs the step as follows:

Average divide the product quantity on the "dummy" machine for allocation to every feasible machine.

The dummy machine deals with a quantity which cannot be allocated to other machines that have keen overloaded. Thus this step of average dividing the overloaded quantity to every feasible machine is employed for the purpose of calculating the final utilization of every machine.

The table of FIG. 7 shows the machine versus product matrix for products" TM1234 and TM5678 (I=1, 2) and Machines TRILL, 515 and dummy (J=1, 2, 3).

The quantity of TRILL is as follows:

35 from original TM1234

60 from original TM5678

50 from dummy row 1 (100÷2)

200 from dummy row 2 (200)

We average/divide the value in the "dummy" machine of row 1 back to every feasible machine with 50 supplied to the 515 machine and 50 supplied to the TRILL machine.

Then the system proceeds to block 42.

Step II

In step 42, the system calculates machine utilization (MU) by the formula in equation (3) as follows:

$$MU = \frac{\left[\frac{\Sigma(\text{Quan alloc} * \text{Treq})}{\text{efficiency \%}} + \text{engineering time}\right]}{(\text{working day} * \text{machine quantity} * \text{available\%})} \quad (3)$$

DEFINITIONS

| | |
|---|---|
| efficiency = | $\frac{\text{average actual test time}}{\text{theoretical test time}}$ |
| engineering time = | Time required to run a pilot run |
| Quan_alloc = | Quantity allocated |
| Treq = | required test time |
| Available capacity = | (working day) * (machine quantity) * (available working) |
| day = | duration of working day in minutes |
| machine quantity = | number of machines |
| available % = | (1-down % - PM % - OFF % - monitor %) |

Then the system proceeds to the decision block 43.

Step III

In decision block 43 the system decides whether the same machine can process both the CP (Circuit Probing) product and the FT (Final Test) product.

If the result of the decision in block 43 is NO, then the system proceeds to block 44 to END the program.

If the result of the decision in block 43 is YES, then the system proceeds to block 45.

1) Machine utilization for CP product.

In block 45, the system then calculates the number of machines needed for CP using the formula described above in connection with block 42 adjusted for CP.

Then the system proceeds to block 46.

2) Machine utilization for FT product.

In block 46, the system then calculates the number of machines needed for FT using the formula described above in connection with block 42 adjusted for FT.

Then the system proceeds to block 47.

3) Machines needed 3-1) In block 47, the number of machines needed for a CP product is calculated by the formula as follows:

Machines for CP product=(CP utilization)*(machine quantity).

Then the system proceeds to block 48.

3-2) In block 48, the number of machines needed for a FT product is calculated by the formula as follows:

Machines for FT product=(FT utilization)*(machine quantity).

Then the system proceeds to decision block 49.

Step IV

Adequacy of Number of Machines

In decision block 49, the system calculates whether there is an insufficient number of machines or an excess number of machines by answering the question "Is utilization greater than or equal to 0?"

If the answer is YES, then the system proceeds on line 49A to block 50. If the answer is NO, then the system proceeds on line 49A to block 51.

In block 50 when the utilization is greater than or equal to 100% ($\geq 100\%$), then the system determines that the machine shortage number equals as follows:

(utilization−1)*machine number.

In block 51 when the utilization is less than one hundred percent (<100%), then the system determines that the machine excess number equals as follows:

(1−utilization)*(machine number).

After either block 50 or 51 the program proceeds to block 52 which is the end of the routine of this invention.

Figure 9:
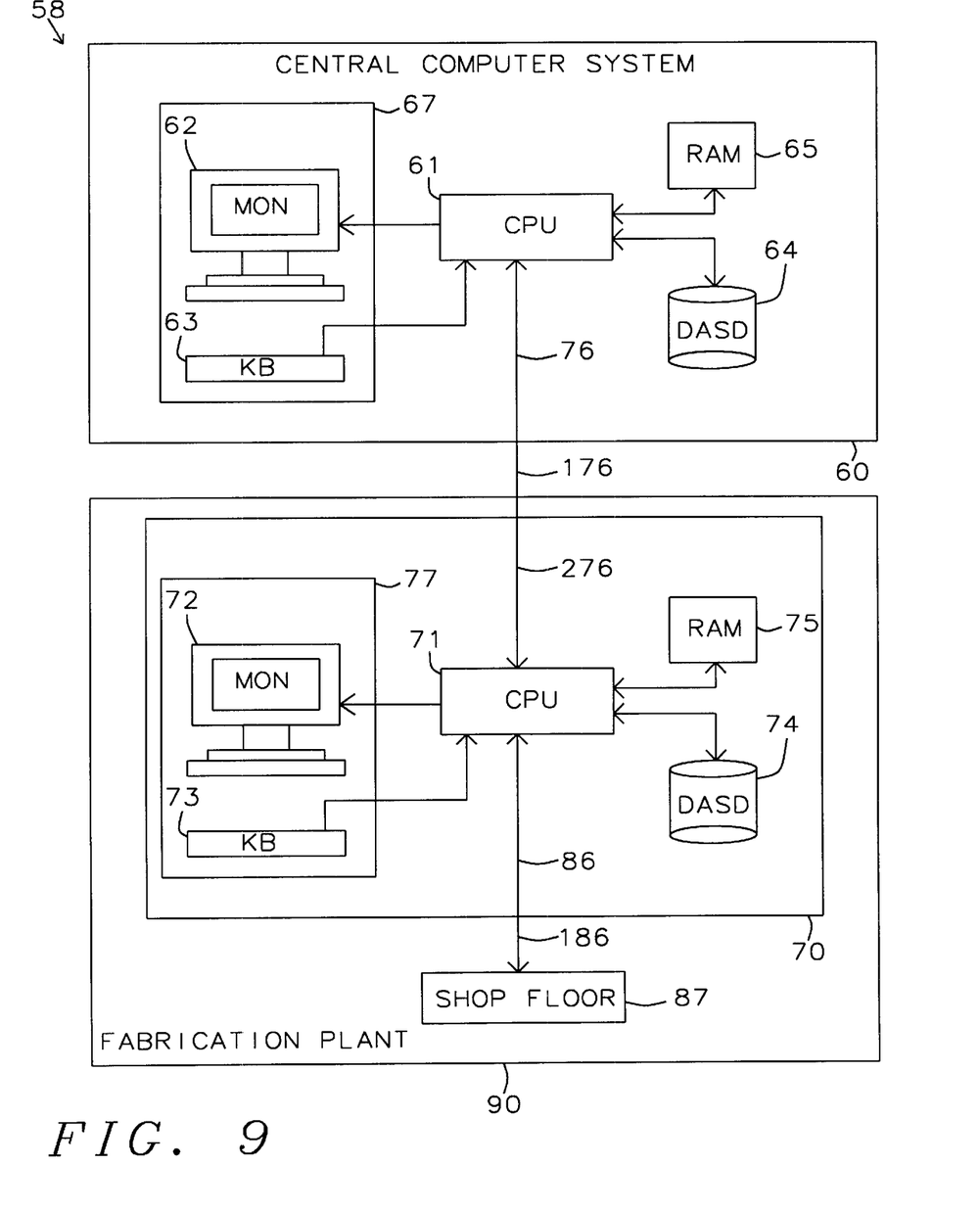
FIG. 9 shows a manufacturing plant which includes a central computer system providing manufacturing control system for a fabrication plant with a shop floor where products, such as semiconductor chips, are being manufactured and a computer system for allocating fabrication plant resources in accordance with this invention.

FIG. 9 shows a manufacturing plant 58 which includes a central computer system 60 and a fabrication plant 90 with a shop floor 87 where products, such as semiconductor chips, are being manufactured and a computer system 70 for allocating fabrication plant resources in accordance with this invention.

The computer program in accordance with this invention is preferably resident in a site in the fabrication plant computer system 70 which is preferably connected, as shown in FIG. 5, as a part of the overall computer system with the central computer system 60, which is an alternative site for the computer program of this invention.

Referring again to FIG. 5, the computer system 70 operates as an integral part of the fabrication plant 90 and so it is shown located within the plant 90, but it may be located elsewhere, as will be obvious to those skilled in the art and it can be a portion of an overall consolidated system incorporating the central computer system 60 and can operate independently as a matter of choice.

The central computer system 60 shown in FIG. 8 comprises a Central Processing Unit (CPU) 61, a terminal 67 with a monitor 62 connected to the CPU 61 for receiving data from the CPU 61 and a keyboard 63 connected to the CPU 61 for sending data respectively to the CPU 61. A Random Access Memory (RAM) 65 and a DASD 64 associated with the CPU 61 are connected for bidirectional communication of data to and from CPU 61.

Lines 76, 176 and 276 provide for interconnections between the CPU 61 of system 60 to the CPU 71 of the fabrication plant computer system 70. Line 176 connects between lines 76 and 276 at the interfaces of computer 60 and a factory control computer system 70 respectively.

The factory control computer system 70 comprises a CPU 71, a terminal 77 with monitor 73 connected to the CPU 71 for receiving data respectively from the CPU 71 and keyboard 73 connected to the CPU 71 for sending data respectively to the CPU 71. A random access memory 75, and a DASD 74 associated with the CPU 71 are shown connected for bidirectional communication of data to and from CPU 71 Line 86 connects from CPU 71 to tine 186 connects through the factory control computer 70 interface to the shop floor system 87. A layout viewer 78 is connected to the CPU 71 to display error flags generated by the pattern for used by the operator of the computer system 70.

The system 58 includes the data defining the scanning of the steppers for the plant 90 stored in one of the DASD unit 64, DASD unit 74 RAM 65 or RAM 75, as desired, in a conventional manner, as will be well understood by those skilled in the art.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by Letters Patent is as follows:

1. A method for allocating products to be tested to machines on a manufacturing line comprising:

providing a standard test time and minimizing total test time with respect to production scheduling in factories, forming a supply demand matrix table for the products and the machines to which the products are to be allocated, and determining the grid location with the minimum testing time Tij.

2. The method of claim 1 including a step of providing the table with the testing time for the machine and the product corresponding to the location on the matrix table.

3. The method of claim 1 including the step of providing the table with the testing time for the machine and the product corresponding to the location on the matrix table.

4. The method of claim 1 including the step of providing the largest possible allocation of time from the corresponding machine at the corresponding position on the matrix table.

5. The method of claim 1 including the steps of:

providing the largest possible allocation of time from the corresponding machine at the corresponding position on the matrix table, determining the grid location with the next minimum testing time Tij, the system looping back to provide the largest possible allocation of remaining time from the corresponding machine, and the system continuing to loop until no demand is left.

6. The method of claim 1 including the steps of:

providing the largest possible allocation of time from the corresponding machine at the corresponding position on the matrix table, determining the grid location with the next minimum testing time Tij, the system looping back to provide the largest possible allocation of remaining time from the corresponding machine, the system continuing to loop until no demand is left, and determining whether an optimum testing process is required.

7. The method of claim 1 including the steps of:

determining the grid location with the minimum testing time Tij, providing the largest possible allocation of time from the corresponding machine at the corresponding position on the matrix table, determining the grid location with the next minimum testing time Tij, the system looping back to provide the largest possible allocation of remaining time from the corresponding machine, the system continuing to loop until no demand is left, average dividing product quantity on a dummy machine to every feasible machine, and determining whether an optimum testing process is required.

8. The method of claim 1 including the steps of:

providing the largest possible allocation of time from the corresponding machine at the corresponding position on the matrix table, determining the grid location with the next minimum testing time Tij, the system looping back to provide the largest possible allocation of remaining time from the corresponding machine, the system continuing to loop until no demand is left, and determining whether an optimum testing process is required by testing whether only one machine can test the product and no quantity is allocated to a machine and if YES branching to calculating of the utilization of each machine and if NO, then deciding whether as follows:

$$N_{COL}+N_{LIN}-1=NV_B \quad (2)$$

where :

$N_{COL}$=number of columns of the transporting matrix, $N_{LIN}$=number of lines of the transporting matrix, $NV_B$=number of basic variable, if YES then proceeding to perform optimum testing, and if NO the branching to calculate the utilization of each machine.

9. The method of claim 8 including steps of:

deciding whether the demand quantity is allocated to a dummy machine, if NO, then END the program and if YES, then proceed to decide whether $$N_{COL}+N_{LIN}-1=NV_B, \text{ and}$$

if NO, them END the gram if YES, then proceed, eliminating the product row that can be tested at one machine, eliminating the machine column that cart test only one product, eliminating the column or row which is irrelevant to a dummy machine with an allocated demand quantity.

10. The method of claim 9 including steps of:

choosing the column or row that has the larger number of basic variables and assigning its U or V value to be zero (0),and getting all values of Ui and Vj by using every relation of the basic formula $$Tij=Ui+Vj,$$

calculating Tij−Ui−Vj of non-variable and largest absolute value in all negative numbers, and if there is a tie randomly choosing one, deciding whether (Tij−Ui−Vj) is larger than 0 for all non-variables;

If YES, then the current solution is optimum and the procedure is stopped and if NO then the system proceeds to calculating the utilization of each machine, and calculating the utilization of each machine as follows:
average dividing the product quantity on the "dummy" machine to every feasible machine, wherein the dummy machine is designed to deal with a quantity which cannot be allocated to other machines that have been overloaded so in this step the system is employed to average dividing the overloaded quantity to every feasible machine for the purpose of calculating the final utilization of every machine, calculating machine utilization (MU) by the formula as follows:

$$MU = \frac{\left[\frac{\Sigma(\text{Quan alloc}*\text{Treq})}{\text{efficiency \%}} + \text{engineering time}\right]}{(\text{working day}*\text{machine quantity}*\text{available\%})} \quad (3)$$

DEFINITIONS

| | |
|---|---|
| efficiency = | $\frac{\text{average actual test time}}{\text{theoretical test time}}$ |
| engineering time = | Time required to run a pilot run |
| Quan_alloc = | Quantity allocated |
| Treq = | required test time |
| Available capacity = | (working day) * (machine quantity) * (available working) |
| day = | duration of working day in minutes |
| machine quantity = | number of machines |
| available % = | (1-down % - PM % - OFF % - monitor %) | deciding whether the same machine can process both the PR product and the FT product and if the result of the decision is NO, then the system proceeds to block to END the program; and if the result of the decision in block is YES, then the system proceeds to process machine utilization for a CP product, calculating the number of machines needed for CP adjusted for CP, calculating the number of machines needed for FT adjusted for FT, calculating the number of machines needed for a CP product, calculating the number of machines needed for a FT product, deciding whether there is an insufficient number of machines or an excess number of machines by answering the question "Is utilization greater than or equal to 100%?", if the answer is YES, then the system determines that the machine shortage number equals as follows:

(utilization−1)*machine number, if the answer is NO, then the system determines that the machine excess number equals as follows:

(1−utilization)*machine number, and then the routine ends.

11. A system for allocating products to be tested to machines on a manufacturing line including:
test time means for providing a standard test time and minimizing the total test time with respect to production scheduling in factories,
supply demand means for forming a supply demand matrix table for the products and the machines to which the products are to be allocated, and
minimum testing time means for determining the grid location with the minimum testing time Tij.

12. The system of claim 11 including:
means for providing a table with the testing time for the machine and the product corresponding to the location on the matrix table.

13. The system of claim 11 including means for providing the table with the testing time for the machine and the product corresponding to the location on the matrix table.

14. The system of claim 11 including means for providing the largest possible allocation of time from the corresponding machine at the corresponding position on the matrix table.

15. The system of claim 11 including means comprising:
means for providing the largest possible allocation of time from the corresponding machine at the corresponding position on the matrix table,
means for determining the grid location with the next minimum testing time Tij,
the system looping back to provide the largest possible allocation of remaining time from the corresponding machine, and
the system continuing to loop until no demand is left.

16. The system of claim 11 including means comprising:
means for providing the largest possible allocation of time from the corresponding machine at the corresponding position on the matrix table,
means for determining the grid location with the next minimum testing time Tij,
the system looping back to provide the largest possible allocation of remaining time from the corresponding machine,
the system continuing to loop until no demand is left, and
means for determining whether an optimum testing process is required.

17. The system of claim 11 including means comprising:
means for providing the largest possible allocation, of time from the corresponding machine at the corresponding position on the matrix table,
means for determining the grid location with the next minimum testing time Tij,
the system looping back to provide the largest possible allocation of remaining time from the corresponding machine,
the system continuing to loop until no demand is left,
means for average dividing product quantity on a dummy machine to every feasible machine, and
means for determining whether an optimum testing process is required.

18. The system of claim 11 including means comprising:
means for providing the largest possible allocation of time from the corresponding machine at the corresponding position on the matrix table,
means for determining the grid location with the next minimum testing time Tij,
the system looping back to provide the largest possible allocation of remaining time from the corresponding machine,
the system continuing to loop until no demand is left, and
means for determining whether an optimum testing process is required by testing whether only one machine can test the product and no quantity is allocated to a machine and if YES branching to calculating of the utilization of each machine and if NO, then deciding whether as follows $$N_{COL}+N_{LIN}-1=N_B \quad (2)$$

where:
$N_{COL}$=number of columns of the transporting matrix,
$N_{LIN}$=number of lines of the transporting matrix,
$N_B$=number of basic variable,
if YES then proceeding to perform optimum testing, and
if NO the branching to calculate the utilization of each machine.

19. The system of claim 18 including:
means for deciding whether the demand quantity is allocated to a dummy machine, if NO, then END the program and if YES, then proceed to decide whether $$N_{COL}+N_{LIN}-1=NV_B, \text{ and}$$

if NO, then END the program if YES, then proceed,
means for eliminating the product row that can be tested at one machine,
means for eliminating the machine column that can test only one product,
means for eliminating the column or row which is irrelevant to a dummy machine with an allocated demand quantity.

20. The system of claim 19 including means for:
choosing the column or row that has the larger number of basic variables and assigning its U or V value to be zero (0),and
getting all values of Ui and, Vj by using every relation of the basic formula $$Tij=Ui+Vj,$$

means for calculating Tij−Ui+Vj of non-variable and largest absolute value in all negative numbers, and if there is a tie randomly choosing one,
deciding whether (Tij−Ui−Vj) of all non-variables is larger than 0;
If YES, then the current solution is optimum and the procedure is stopped and if NO, then the system proceeds to means for calculating the utilization of each machine, and
means for calculating the utilization of each machine as follows:
average dividing the product quantity on the "dummy" machine to every feasible machine, wherein the dummy machine is designed to deal with a quantity which cannot be allocated to other machines that have been overloaded so in this step the system is employed to average dividing the overloaded quantity to every feasible machine for the purpose of calculating the final utilization of every machine, means for calculating machine utilization (MU) by the formula:

$$MU = \frac{\left[\frac{\Sigma(\text{Quan\_alloc} * \text{Treq})}{\text{efficiency \%}} + \text{engineering time}\right]}{(\text{working day} * \text{machine quantity} * \text{available\%})} \quad (3)$$

DEFINITIONS efficiency = $\frac{\text{average actual test time}}{\text{theoretical test time}}$ engineering time = Time required to run a pilot run
Quan_alloc = Quantity allocated
Treq = required test time
Available capacity = (working day) * (machine quantity) * (available working)
day = duration of working day in minutes
machine quantity = number of machines
available % = (1-down % - PM % - OFF % - monitor %)

deciding whether the same machine can process both the CP product and the FT product and if the result of the decision is NO, then the system proceeds to block to END the program; and if the result of the decision in block is YES, then the system proceeds to process machine utilization for a CP product, means for calculating the number of machines needed for CP adjusted for CP, means for calculating the number of machines needed for FT adjusted for FT, means for calculating the number of machines needed for a CP product, means for calculating the number of machines needed for a FT product, deciding whether there is an insufficient number of machines or an excess number of machines by answering the question "Is utilization greater than or equal to 100%?", if the answer is YES, then the system determines that the machine shortage number equals as follows:

(utilization−1)*machine number, if the answer is NO, then the system determines that the machine excess number equals as follows:

(1−utilization)*machine number, and then the routine ends.

\* \* \* \* \*